(12) United States Patent
Sindelar (10) Patent No.: US 8,870,237 B2
(45) Date of Patent: Oct. 28, 2014

(54) MECHANICALLY ATTACHED FITTING FOR USE IN A SOUR ENVIRONMENT

(75) Inventor: Mark John Sindelar, Shaker Heights, OH (US)

(73) Assignee: Lokring Technology, LLC, Willoughby, OH (US)

( * ) Notice: Subject to any disclaimer, the term of this patent is extended or adjusted under 35 U.S.C. 154(b) by 435 days.

(21) Appl. No.: 12/984,360

(22) Filed: Jan. 4, 2011

(65) Prior Publication Data

US 2011/0163536 A1 Jul. 7, 2011

Related U.S. Application Data

(60) Provisional application No. 61/292,122, filed on Jan. 4, 2010.

(51) Int. Cl.
*F16L 13/14* (2006.01)
(52) U.S. Cl.
CPC ................................. *F16L 13/146* (2013.01)
USPC ...... 285/382.7; 285/242; 285/256; 285/382.2
(58) Field of Classification Search
USPC .......... 285/81, 89, 148.1, 232, 237, 242, 256, 285/259, 330, 382, 382.1, 382.2, 382.7
See application file for complete search history.

(56) References Cited

U.S. PATENT DOCUMENTS

| | | | |
|---|---|---|---|
| 2,613,959 A | 10/1952 | Richardson | |
| 2,695,796 A | 11/1954 | Woodling | |
| 2,816,781 A | 12/1957 | Woodling | |
| 3,262,721 A | 7/1966 | Knight | |

(Continued)

FOREIGN PATENT DOCUMENTS

| | | |
|---|---|---|
| CA | 2078553 A1 | 9/1991 |
| CA | 2289356 A1 | 6/2000 |

(Continued)

OTHER PUBLICATIONS

International Search Report and Written Opinion issued Sep. 2, 2011 in corresponding PCT application PCT/US2011/020115.

(Continued)

*Primary Examiner* — Aaron Dunwoody
*Assistant Examiner* — Fannie Kee
(74) *Attorney, Agent, or Firm* — Pearne & Gordon LLP (57) ABSTRACT

A fitting for coupling with a pipe in a sour environment includes a coupling body, a ring positioned to fit over an end of the coupling body, a main seal formed on an inner surface of the coupling body, a transition section positioned adjacent the main seal, an inboard seal formed on an inner surface of the coupling body, and an outboard seal formed on an inner surface of the coupling body. The transition section is formed as an indentation on the inner surface of the coupling body and has a first portion with a first diameter and a second portion with a second diameter, with the first diameter being greater than the second diameter. When the ring is fitted over the at least one end of the coupling body via force, the ring and coupling body apply a coupling force to the main seal, the outboard seal and the inboard seal to connect the pipe to the coupling body in a non-leaking manner. The fitting is made of a low alloy carbon steel material. The main seal includes a first seal, a second seal, and a third seal.

18 Claims, 7 Drawing Sheets

(56) References Cited

U.S. PATENT DOCUMENTS

| | | |
|---|---|---|
| 3,299,496 A | 1/1967 | Christensen |
| 3,402,948 A | 9/1968 | Kreidel, Sr. et al. |
| 3,498,648 A | 3/1970 | Hallesy |
| 3,653,115 A | 4/1972 | Perkins |
| 3,675,949 A | 7/1972 | Dawson |
| 3,699,625 A | 10/1972 | Spencer et al. |
| 3,726,122 A | 4/1973 | Dawson |
| 3,727,289 A | 4/1973 | Bemelmann et al. |
| 3,742,754 A | 7/1973 | Jeromson, Jr. et al. |
| 3,762,059 A | 10/1973 | Dawson |
| 3,827,727 A | 8/1974 | Moebius |
| 3,889,989 A | 6/1975 | Legris |
| 3,893,720 A | 7/1975 | Moebius et al. |
| 3,997,195 A | 12/1976 | Bartholomew |
| 4,061,367 A | 12/1977 | Moebius |
| 4,114,930 A | 9/1978 | Perkins |
| 4,183,560 A | 1/1980 | Wyss |
| 4,189,817 A | 2/1980 | Moebius |
| 4,309,050 A | 1/1982 | Legris |
| 4,345,361 A | 8/1982 | Baumann |
| 4,470,575 A | 9/1984 | Stoll |
| 4,482,174 A | 11/1984 | Puri |
| 4,705,302 A | 11/1987 | Beiley |
| 4,768,275 A | 9/1988 | Schmitz |
| 4,867,489 A | 9/1989 | Patel |
| 4,903,995 A | 2/1990 | Blenkush et al. |
| 4,985,975 A | 1/1991 | Austin et al. |
| 5,110,163 A | 5/1992 | Benson et al. |
| 5,114,191 A | 5/1992 | Sareshwala |
| 5,181,752 A | 1/1993 | Benson et al. |
| 5,303,958 A | 4/1994 | Hyatt et al. |
| 5,305,510 A | 4/1994 | Croft et al. |
| 5,423,581 A | 6/1995 | Salyers |
| 5,452,921 A | 9/1995 | Hyatt et al. |
| 5,470,113 A | 11/1995 | Schwalm |
| 5,586,749 A | 12/1996 | Conley et al. |
| 5,595,368 A | 1/1997 | Bogdany |
| 5,709,418 A | 1/1998 | Benson et al. |
| 6,131,964 A | 10/2000 | Sareshwala |
| 6,206,437 B1 | 3/2001 | Humphreys |
| 6,450,553 B1 | 9/2002 | Suresh |
| 6,467,752 B2 | 10/2002 | Woods |
| 6,692,040 B1 | 2/2004 | McKay |
| 7,503,595 B2 | 3/2009 | McKay |
| 7,575,257 B2 | 8/2009 | McKay |
| 2005/0264006 A1 | 12/2005 | McKay |
| 2006/0186666 A1* | 8/2006 | McKay ............ 285/382 |
| 2006/0284415 A1* | 12/2006 | McKay ............ 285/256 |

FOREIGN PATENT DOCUMENTS

| | | |
|---|---|---|
| CA | 2421526 A1 | 3/2002 |
| CA | 2346548 A1 | 4/2002 |
| DE | 556114 C | 8/1932 |
| DE | 2401505 A1 | 7/1975 |
| EP | 1043535 A1 | 10/2000 |
| EP | 1195550 A2 | 4/2002 |
| FR | 706420 A | 6/1931 |
| GB | 1493892 A | 11/1977 |
| JP | 7-139670 A | 5/1995 |
| JP | 8-323883 A | 12/1996 |
| KR | 20-1990-0018956 U | 11/1990 |
| KR | 20-1994-0027139 U | 12/1994 |
| WO | 92/00483 A1 | 1/1992 |

OTHER PUBLICATIONS

Biersteker et al., "Qualification of Non-Standard Piping Product Form for ASME Code for Pressure Piping, B31 Applications," Codes and Standards and Applications for Design and Analysis of Pressure Vessel and Piping Components, PVP-vol. 210-1, American Society of Mechanical Engineers, NY, 1991, pp. 127-134.

* cited by examiner

MECHANICALLY ATTACHED FITTING FOR USE IN A SOUR ENVIRONMENT

CROSS-REFERENCE TO RELATED APPLICATIONS

This application claims priority to U.S. Provisional Patent Application No. 61/292,122, filed Jan. 4, 2010, the disclosure of which is incorporated herein by reference in its entirety.

FIELD

This technology relates to a fluid fitting. In particular, the technology concerns a fluid fitting for mechanically attaching and sealing a pipe for use in sour applications.

BACKGROUND $H_2S$ (hydrogen sulfide) in the presence of water can result in damage to carbon steel pipelines in the form of corrosion, cracking, or blistering. The effects of H2S on steel can be classified as those that require external stress, such as with sulphide stress cracking (SSC), and those that do not, such as hydrogen induced cracking (HIC), and corrosion. The presence of carbon dioxide in the sour environment tends to increase the corrosion rate in the steel. It may also increase the susceptibility of the steel to both SSC and HIC, with the effect on HIC being more pronounced.

SSC is characterized by an initial single, straight, transgranular crack that develops under the application of an external stress, either applied or residual. It may initiate at a corrosion pit (or any other feature that may act as a stress raiser) or through a hydrogen cracking mechanism (e.g., blistering) and then propagate into a brittle fracture perpendicular to the direction of the applied stress. SSC in high-strength steels tends to have considerable branching, while that in low-strength steels shows little. SSC may occur in welds or in the heat-affected zones next to the welds. It usually occurs in carbon steels with tensile strengths greater than 550 megapascals (MPa). However, SSC failures have also occurred in steels with tensile strengths less than 550 MPa. This is primarily due to rapid cooling of weldment, creating localized areas of high hardness.

HIC does not normally occur in welds, but rather in pipe body areas having slag inclusions that act as sites for the collection of diffusing hydrogen. HIC involves two basic forms, straight cracks and stepwise cracks. HIC can occur in low-strength steels with hardness values well below RC 22, with or without the presence of an external stress. Corrosion at the steel surface produces atomic hydrogen, which penetrates and diffuses through the steel until it is trapped at naturally occurring irregularities in the metal, such as non metallic inclusions and laminations. This atomic hydrogen combines into molecular hydrogen and builds up a gas pressure high enough to surpass the yield strength of the steel, forming blisters. Adjoining blisters may propagate as cracks, normally parallel to the rolling direction of the steel.

Another phenomenon associated with HIC is hydrogen embrittlement in steel pipes and welded joints, which generally denotes a loss in ductility of the metal as a result of hydrogen penetration. The susceptibility to hydrogen embrittlement depends on the chemistry and microstructure of the material. Therefore, different regions of the pipe and weldment may embrittle differently due to the presence of hydrogen. Thus, it is desirable to avoid the use of welds in sour applications. In addition, welding may often be difficult in certain environments, whether due to location, harsh conditions, the presence of gases, or otherwise.

SUMMARY

In accordance with the teachings described herein, a fitting for coupling with a pipe in a sour environment is described.

DETAILED DESCRIPTION

The example fitting 10 is utilized to replace welding with a mechanically attached fitting that is suitable for use in a NACE (National Association of Corrosion Engineers) environment or application, such as in the presence of corrosive process fluids or gases, such as Hydrogen Sulfide. Use of a mechanically attached fitting 10 to replace the conventional welded joint results in a reduction in cost and improves quality, safety, and reliability of the joint. The example fitting 10 may be utilized to connect either thin walled or thick walled pipes, such as those ranging in size from ¼" NPS to 4" NPS, although other pipe sizes may also derive a benefit from the example fitting 10.

The example fitting 10, as shown in the attached figures, includes predetermined ratios of interference between a drive ring 14, body 12, and pipe 16 along the length of a cylindrical contact area. The example fitting 10 may be installed on pipes 16 and meets the requirements for qualification to ASME B31 for burst and thermal expansion (flexural fatigue). The example fitting 10 also minimizes the affects of fitting compression on work hardening of fitting/pipe areas that are exposed to corrosive media. This allows the fitting/pipe assembly that incorporates the example fitting 10 to meet the requirement of the NACE TM0177 corrosion test.

FIGS. 1-8 illustrate the diametral and axial relationships between the pipe 16, the seals 30, 32, 34 defined on the inner surfaces 36 of the body 12 of the fitting 10, including the transition sections 24, 26 between the seals 30, 32, 34, and the diametral and axial relationships of the exterior 22 of the body 12 and the interior surfaces of the ring 14. The example fitting 10 is made from an AISI-SAE 4130 low alloy grade of carbon steel material. The combination of the fitting geometry and material provides acceptable fitting joint performance in NACE applications.

The example shown in FIGS. 1-8 is a fitting 10 having two opposed ends 42a, 42b, with each end being configured to accept a pipe body 16 therein. The example shown in FIGS. 9-11 has a single end 42a for receiving a pipe body 16, while the other end serves as a flange 18. Other types of fittings may also utilize the teachings herein.

Figure 1:
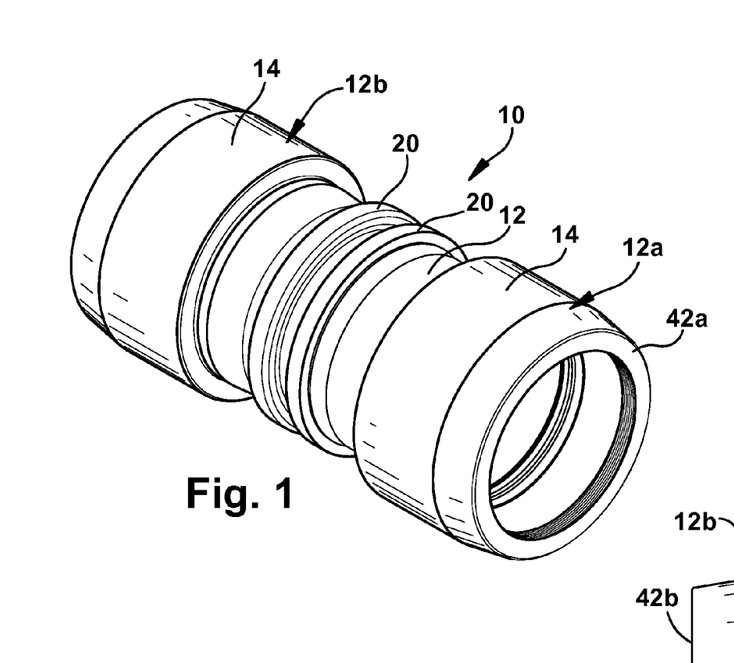
FIG. 1 is a perspective view of an example fitting having opposed ends for coupling together two pipes.

Referring to FIG. 1, the fitting 10 includes a coupling body 12 and at least one swage ring 14. The example shown in FIGS. 1-8 has two swage rings 14 while the example shown in FIGS. 9-11 has one swage ring 14. The coupling body 12 and the ring 14 together are utilized to join a pipe body 16 to the fitting 10. The components are generally symmetrical about a central axis.

Figure 2:
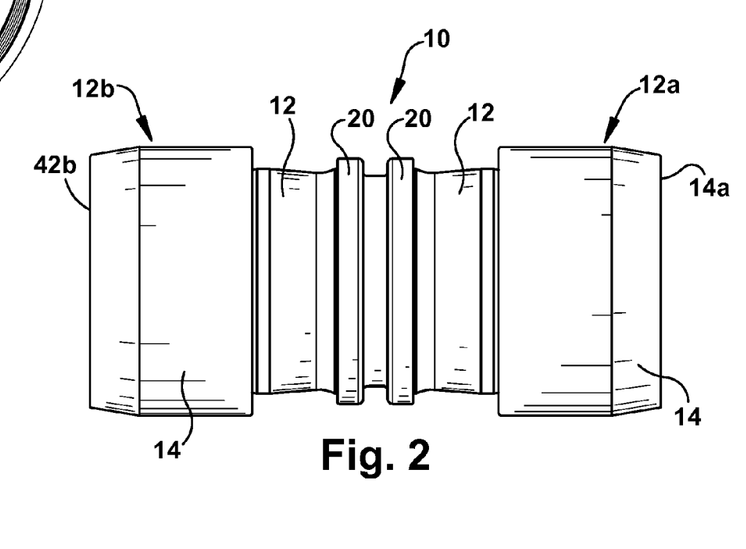
FIG. 2 is a plan view of the example fitting of FIG. 1.

The coupling body 12 includes a first sleeve 12a (which forms the right side of the coupling body 12 in FIG. 2) and a second sleeve 12b (which forms the left side of the coupling body 12 in FIG. 2). The first sleeve 12a is for receiving a first pipe body 16 and the second sleeve 12b is for receiving a second pipe body 16. As will be described in more detail below, when the swage rings 14 are axially forced onto the respective sleeves 12a, 12b with the pipe sections 16 received therein, the sleeves 12a, 12b become mechanically connected to and sealed with the tube or pipe sections. The interior of the body has a stop 80 that stops the axial movement of a pipe 16 into the interior of the body 12.

The coupling body 12 and the swage ring 14 are formed of high strength, low alloy carbon steel, such as an AISI-SAE 4130 low alloy grade of carbon steel. Other carbon steels include UNS413000 and UNS414000 grades. The chemical composition of the carbon steel is compatible with the process chemicals used in NACE applications and displays limited corrosion, effectiveness under harsh environmental conditions, and is an accepted material of customers. In addition, carbon steel has properties that allow it to support all aspects of the mechanical load requirements of the example fitting 10. Other materials may also be utilized, if desired, as known by those of skill in the art. But, advantageously, carbon steel may be utilized in sour applications in order to avoid the need to weld. The pipe 16 may range in size, as discussed above, the example fitting 10 not being limited to a particular size of pipe.

Figure 7:
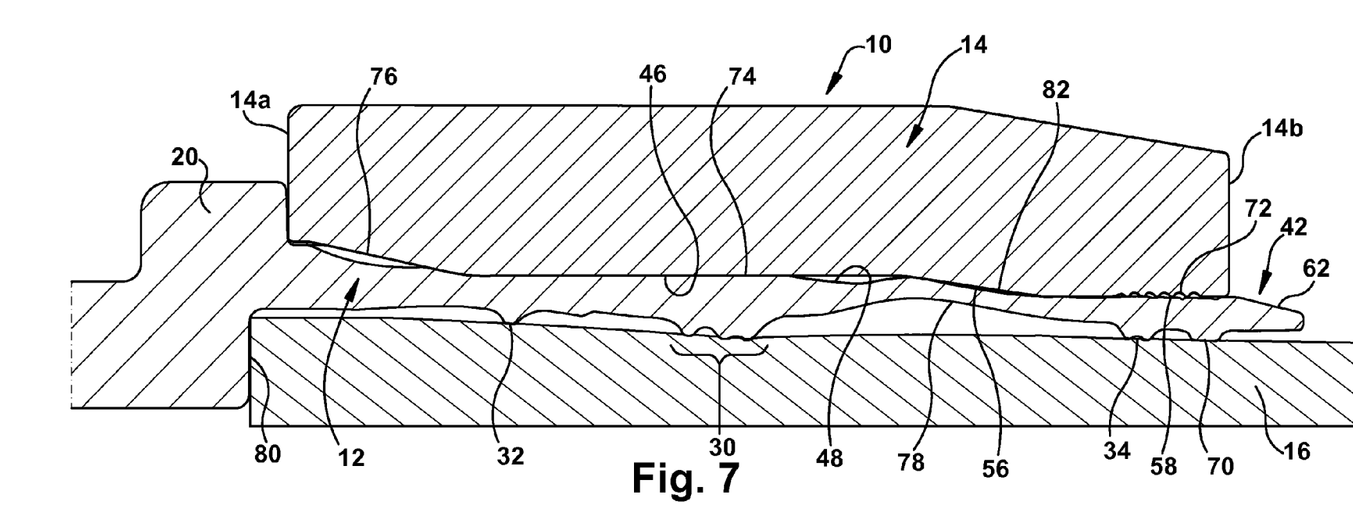
FIG. 7 is a cross-sectional view similar to FIG. 6, but showing the ring in a fully installed position on the end of the body and the associated deformation of the sleeve and pipe.
Figure 8:
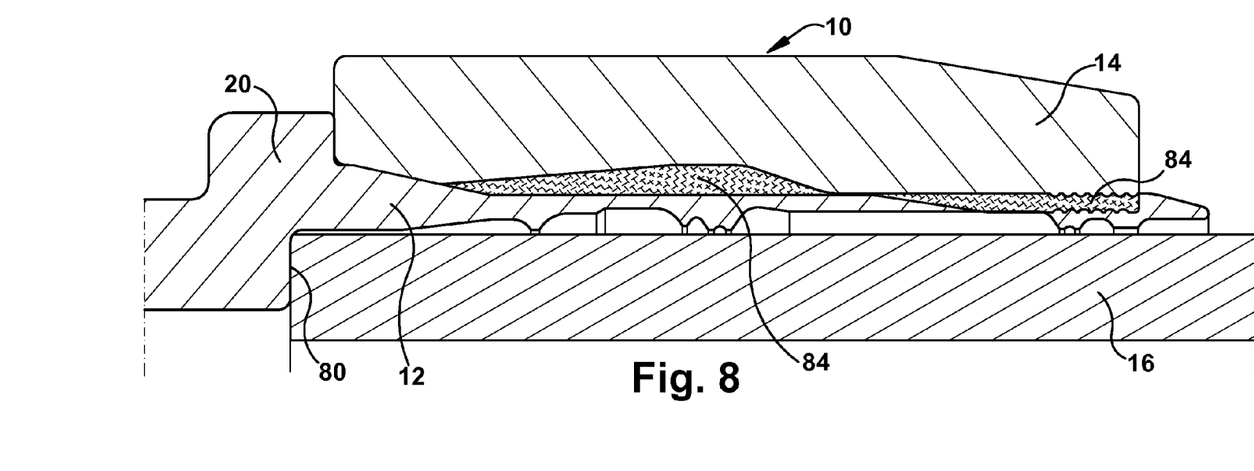
FIG. 8 is a cross-sectional view similar to that of FIG. 7, but showing the portions of the various parts that overlap one another.
Figure 9:
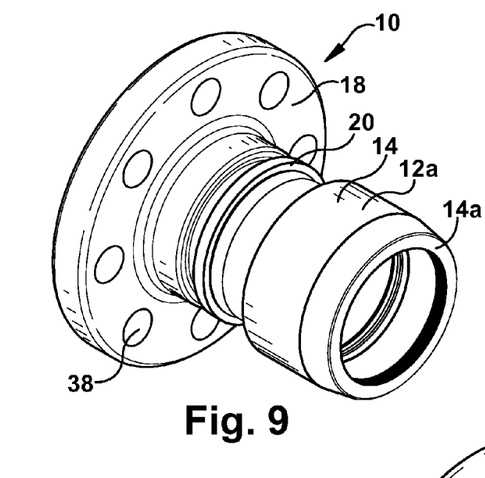
FIG. 9 is a perspective view of an alternative example fitting having a single end for coupling to a pipe and a flange defined on the opposite end.
Figure 10:
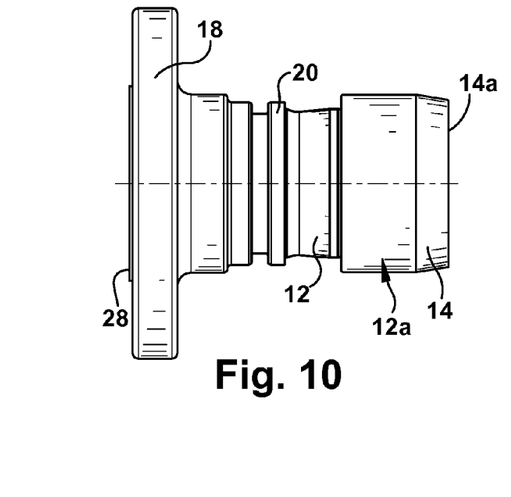
FIG. 10 is a plan view of the example fitting of FIG. 9.
Figure 11:
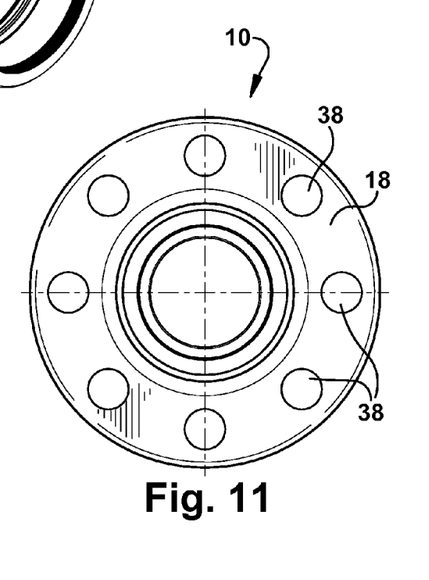
FIG. 11 is a right end view of the example fitting of FIG. 9.

Referring to FIGS. 9-11, the exact configuration of the fitting 10 can vary and need not include the two sleeves 12a, 12b shown in FIGS. 1-8 in a coaxial configuration. For example, the fitting 10 could be integrally formed or configured to connect with another component or type of fitting, and may have any number of sleeves extending at various locations therefrom for connecting to one or more corresponding pipes 16. A particular example could be a combination fitting and ball-valve wherein the fitting 10 is combinable with a ball-valve in a similar manner as described in commonly owned U.S. Pat. No. 6,467,752, expressly incorporated herein by reference in its entirety. Commonly owned U.S. Pat. Nos. 7,575,257; 6,692,040; 6,131,964; 5,709,418; 5,305,510; and 5,110,163 are also expressly incorporated herein by reference in their entirety. The example shown in FIGS. 9-11 has a sleeve 12a at one side and a perpendicular flange 18 on the other side. The flange 18 includes a sealing surface 28 and holes 38 for receiving bolts in order to couple the flange 18 to a surface. The geometry of the fittings can be put into configurations such as the flange shown in FIGS. 9-11 all in a single body without requiring a weld joint, or other standard configurations of standard ASME fittings.

Figure 3:
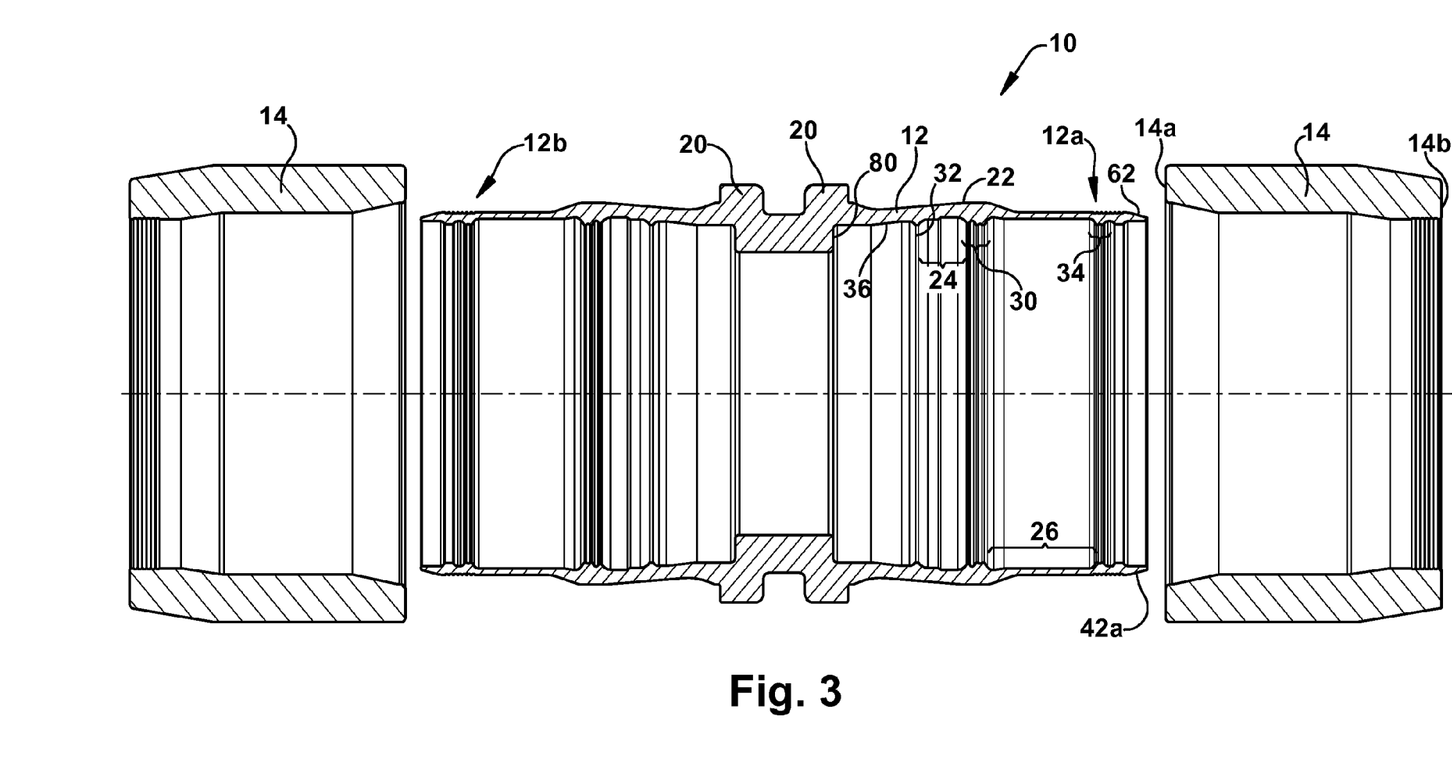
FIG. 3 is a cross-sectional view of the example fitting of FIG. 1, showing the rings on the end of the fitting uncoupled.

As shown in FIG. 3, the fitting 10 is axially a mirror image of itself. Therefore, any discussion of sleeve 12a is applicable to sleeve 12b and will not be repeated.

Sleeve 12a includes a circumferential flange or ridge 20 extending radially outwardly from exterior outside surface 22 of the body 12. The ridge 20 is used in joining the sleeve 12a to the adjacent swage ring 14 when connecting the fitting 10 to a pipe body 16, as known by those of skill in the art. A tool (not shown) may be used to drive the ring 14 against the flange 20.

Figure 4:
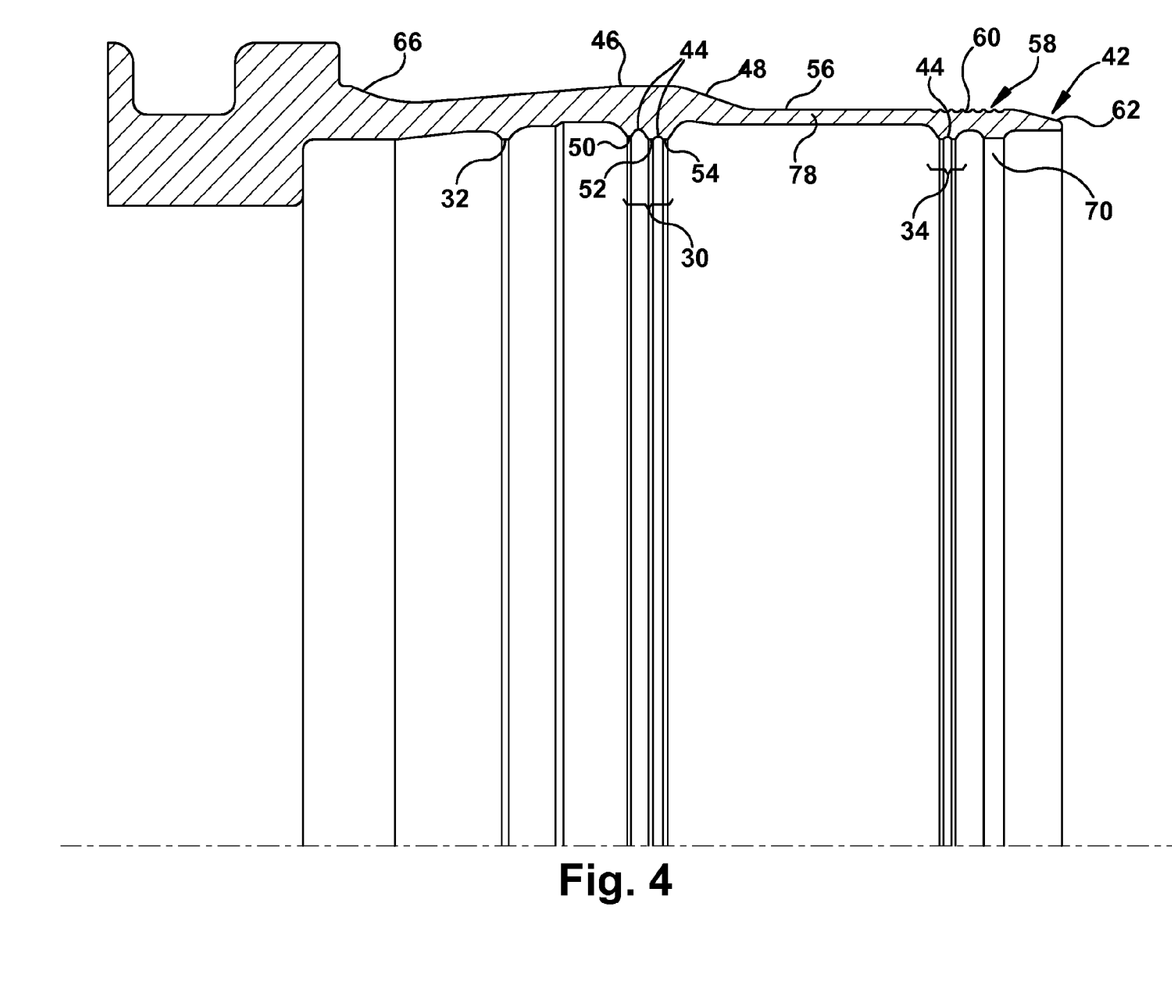
FIG. 4 is a cross-sectional view of one end of the sleeve of the example fitting of FIG. 1.
Figure 5:
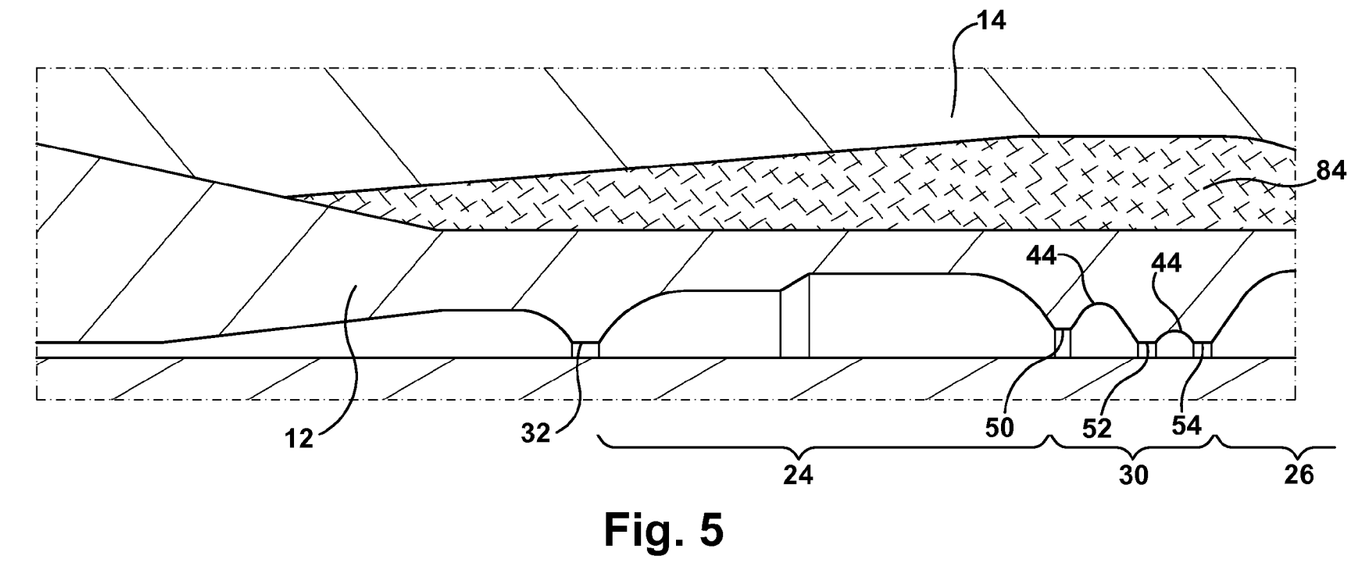
FIG. 5 is a cross-sectional view of the some of the sealing surfaces of the body of the example fitting of FIG. 1.

Referring to FIGS. 3-5, the sleeve 12a includes a plurality of spaced apart seals, including the main seal 30, the inboard seal 32 and the outboard seal 34, for sealing between and mechanically connecting the coupling body 12 to a pipe 16. The seals 30, 32, 34 extend inwardly from the interior surface 36 of the coupling body 12. As used herein, the terms "inboard" and "outboard" are used to generally indicate relative axial spacing, such as from the exterior flange 20 or the end 42. Thus, the outboard seal 34 is axially spaced relative to the flange 20 a greater distance than is the inboard seal 32. The outboard seal 34 is a safety seal that is used as a back up for internal pressures in the pipeline. The outboard seal 34 also functions to limit external environments from getting into the seals, such as moisture from the external environment or dirt. A double outboard seal 34 is provided and is useful in harsh environments, such as where sealing may be more difficult due to poor surface quality of the pipe. Example applications would be on or off-shore oil rigs located in such places as in the North Sea or in Alaska. The double seal 34 is utilized to provide extra protection. Where one seal may fail, the other seal serves as a back up. The outboard seal 34 is a smaller version of the trapezoidal main seals, which will be discussed in greater detail below, and the two seals that comprise the outboard seal 34 are blended together by a blending radius.

Figure 6:
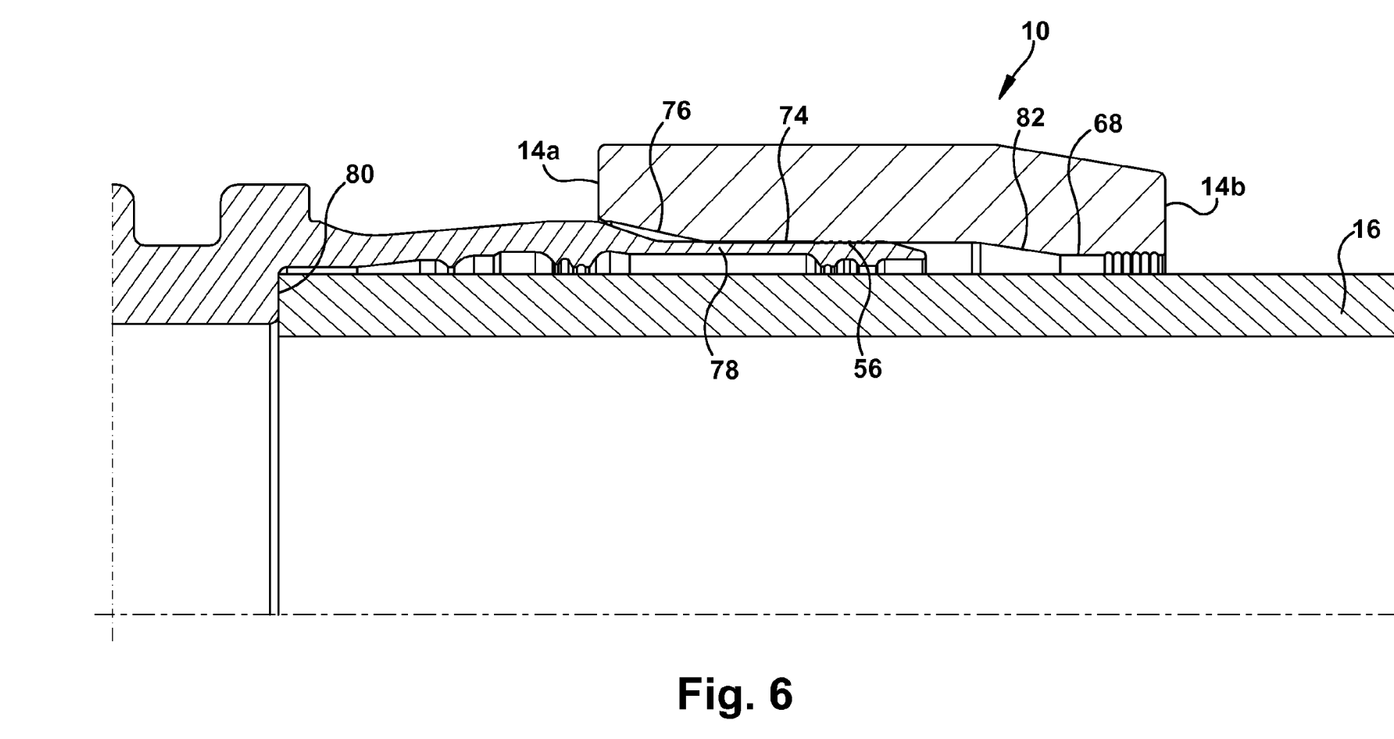
FIG. 6 is a cross-sectional view of one end or sleeve of the example fitting of FIG. 1, showing the ring partially installed on the end of the body with a pipe positioned inside the body.

Referring to FIGS. 3-8, the main seal 30 serves to provide a main fluid seal and mechanical connection with the pipe 16. The main seal 30 includes a first tooth 50, a second tooth 52, and a third tooth 54, which are axially spaced from the flange 20 and the end 42 of the coupling body 12. The teeth 50, 52, 54 are slightly separated from one another by grooves 44. Transition sections or wall sections 24, 26 are positioned before and after the main seal 30. The transition sections 24, 26 are used to urge the teeth 50, 52, 54 into the pipe 16 or to conform to the shape of the drive ring 14. The transition sections 24, 26 also allow the sleeve 12a to decompress onto the pipe 16. The transition sections 24, 26 also allow the three main seal teeth 50, 52, 54 to cam in together, which results in a better joining with the pipe 16. FIGS. 5 and 8 show the overlap areas 84 between the body 12 and the ring 14 that requires some type of deformation or biting. In order for the ring to move past the body in this area 84, either the teeth must bite into the pipe 16, the pipe 16 must deform, or the ring 14 and/or body 12 must deform.

The transition section 26 that is positioned outboard of the main seal has a ramp that extends away from the pipe wall 16 to a first diameter and then decreases in diameter to a second diameter. The outboard transition section 26 has a first portion with a first diameter and a second portion with a second diameter. The second diameter of the second portion wall has a substantially constant diameter from the point where the second diameter is attained until it reaches the outboard seal 34.

A second inboard transition section is positioned inboard of the main seal 30. The inboard transition section has a first portion with a first diameter and a second portion with a second diameter, similar to the outboard transition section.

Depending upon the proximity of the inboard seal 32, the second portion is shorter in length than with the first transition section.

As shown in FIG. 5, the second 52 and third teeth 54 of the main seal 30 have a trapezoidal cross-section and are spaced inwardly at a first diameter D1 relative to the pipe wall 16. The angles of the side walls leading down to the face of the teeth are substantially equal. The trapezoidal shape of the teeth 50, 52, 54 is more robust and provides more mass to press down against the pipe 16 than with prior designs. The teeth mass is doubled relative to prior designs. The teeth 50, 52, 54 are also larger in mass than those known in the prior art in order to face the challenges associated with installing the coupling body 12 on pipe outside diameter surfaces that can be of lesser quality.

In addition, the main seal 30 teeth 50, 52, 54 are blended into the interior wall of the sleeve 12a by a radius at the root of each tooth 50, 52, 54. This assists in decreasing stress and deterring wall fracture. The radius at the root of each tooth 50, 52, 54 may be optimized to reduce the possibility of stress concentrations.

The first tooth 50 also has a trapezoidal cross-section and is spaced inwardly at a second diameter D2 relative to the pipe wall 16. The second diameter D2 is greater than the spacing of the first diameter D1 for the second and third teeth 52, 54. The transition sections 24, 26 are used to help to drive the teeth 50, 52, 54 into the pipe 16 as the ring 14 is forced over the exterior surface of the sleeve 12a.

The inboard seal 32 is located between the main seal 30 and the flange 20. Like the main seal 30, the inboard seal 32 provides a fluid seal and a mechanical connection with the pipe 16. The inboard seal 32 is a single tooth, but could be formed by a plurality of teeth, which can be separated from one another by one or more appropriate grooves 44. The inboard transition section 24 is positioned between the inboard seal 32 and the main seal 30.

Referring to FIGS. 6 and 7, the body 12 further includes at least one anti-torsion ridge 70, which is referred to herein for simplicity as the "torsion ridge." The torsion ridge 70 is shown located between the outboard seal 34 and the end 42 of the sleeve 12a, but could be located between the main seal 30 and the outboard seal 34. The torsion ridge 70 is primarily provided to carry torsion loads between the body 12 and the pipe 16. The anti-torsion ridge 70 is spaced axially outwardly from the main seal 30 a sufficient distance so that a reduction in the diameter of the pipe 16 by the main seal 30 does not interfere with engagement between the torsion ridge 70 and the pipe 16. The torsion ridge 70 preferably has friction surfaces that can be formed by knurling, broaching or the like to better resist torsion loads.

Referring to FIG. 4, the outside surface 22 of the body 12 has an interior portion 56 between the land 46 and the end 42. The interior portion 56 has a relatively smaller diameter than the land 46 and the flange 20. The interior portion 56 of the body 12 has an increased friction section 58, also referred to as a locking mechanism or anti-backoff grooves, adjacent the end 42. The friction section 58 includes a plurality of ridges 60 to better retain the swage ring 14 on the coupling body 12 once the swage ring 14 is fully installed on the body 12. The friction ridges 60 assist in preventing the swage ring 14 from slipping or working off the body 12. Another feature provided adjacent the end 42 is taper 62 which preferably has a taper angle of about twenty degrees or more. The taper 62 assists in initially installing the swage ring 14 onto the body 12. The exterior surface 22 of the sleeve 12a has a ramp section 48 positioned between portion 56 and land 46. In addition, another ramp 66 is positioned adjacent the flange 20.

The swage or drive ring 14 is sized to be annularly received over and axially forced along the sleeve 12a toward the flange 20 for forcing the seals 30, 32, 34 to bite into the pipe 16 to seal and mechanically connect the body 12 with the pipe 16. The swage ring 14 includes an inboard portion 14a and an outboard portion 14b. The outboard portion 14b or the ring 14 is generally thicker than the inboard portion 14a. The ring 14 includes a first land 68 at the end 14b and the first land 68 includes a plurality of ridges 60 that form the friction section 72 for mating with the friction section 58 of the body. The first land 68 is connected to a first ramped up portion 82 that serves as a leading surface to help center the ring 14 on the sleeve 12a and to help funnel and channel the interferences on the sleeve 12a. In general, the surfaces on the ring 14 assist in easing the installation of the ring 14 over the sleeve.

The swage ring 14 further includes an interior surface 74. The interior surface 74 is generally cylindrical and is coupled to a ramped up section 76 at end 14a. Surfaces 74 and 56 serve as compression surfaces.

A ramped portion 76 has a greater diameter than the interior surface 74 of the ring. Although not shown, the ring 14 may also include a kickdown tapered segment, as known by those of skill in the art. The kickdown segment could be a ridge defined in the vicinity of the main seal 30 when the ring 14 is fully installed. The angle of the ramped up section 76 substantially matches the angle of ramp 48 and facilitates axial movement of the swage ring 14 past the land 46.

Referring to FIG. 6, the swage ring 14 is shown partially installed or preassembled on the coupling body 12 in a pre-installed position. In this position, the swage ring ramped up section 76 is adjacent, but slightly spaced relative to, the main seal land section 46. Through an interference fit, the swage ring 14 is maintained and can be shipped to customers in the pre-installed position on the coupling body 12, which facilitates ease of use and installation by the ultimate end-users.

Referring to FIG. 7, to fully install the swage ring 14 onto the sleeve 12a with the pipe 16 inserted therein for purposes of mechanically connecting and sealing the fitting 10 to the pipe 16, an installation tool (not shown) can be used to further force the swage ring 14 onto the sleeve 12a toward the tool engaging flange 20. Axial movement of the swage ring 14 onto the coupling body 12 with the pipe 16 inserted therein causes radial movement of the body 12, and particularly the seals 30, 32, 34 of the body 12, toward or into the pipe 16 to create seals and mechanical connections therewith. In addition, the pipe 16 deforms and the coupling body 12 deforms.

The body 12 and the swage ring 14 are configured so that the seals 30, 32, 34 are sequentially set, one at a time, and a restoring load force is applied to the main seal 30, all in a preferred order as the swage ring 14 is moved from the pre-installed position to the final installed position. There is no deforming contact with the pipe 16 by an un-set seal until the prior seal is fully set. Setting of a seal means the tooth or teeth of the seal are swaged or forced into deforming contact with the pipe 16. Setting of a seal is considered complete (i.e., fully set) when the seal's tooth or teeth are completely forced into the pipe 16 (e.g., when the exterior surface 22 immediately opposite the seal 30 or 32 or 34 has no further radial movement as a result of being forced inward by a particular section of the swage ring 14).

Alternatively, full setting of a seal can be defined as when the drive ring 14 has forced the tooth or teeth of the seal furthest into the pipe 16 or when an actuating taper of the drive ring 14 levels out to a diametrically constant cylindrical section as the drive ring 14 moves past the seal. The pipe 16 typically becomes stressed beyond its elastic limit as the seals 30, 32, 34 continue to bite into the surface and the pipe 16 begins to plastically deform or move radially inwardly resulting in permanent deformation. As illustrated in FIG. 7, the teeth 50, 52, 54 of the main seal 30 bite into and deform the pipe 16 and are themselves somewhat deformed. This functions to fill any rough or irregular surface imperfections found on the outside of the pipe 16.

Simultaneous with the radial movement of the body 12 and the deformation of the pipe 16, radial movement of the swage ring 14 occurs outwardly. This radial movement of the swage ring 14 is typically elastic, and results in only a small increase in the diameter of the swage ring 14.

As shown in FIG. 7, the swage ring 14 is forced axially on the body sleeve 12a to the illustrated final installed position. In this position, the swage ring 14 abuts or engages the body flange 20. Alternatively, the swage ring 14 could be positioned closely adjacent the flange 20 without contact therewith. In the final installed position, all the seals 30, 32, 34 are set, as well as biting of the torsion ridge 70 into the pipe 16. Cooperation between the coupling body 12 locking mechanism 58, also referred to as anti-back off grooves, of the interior portion 56 and the swage ring locking mechanism 72 prevents, or at least reduces the likelihood that, the swage ring 14 will axially dislodge itself from the sleeve 12a.

In addition to deformation of the teeth, swage ring 14, and pipe 16, the coupling body 12 also deforms. As shown in FIG. 7, the thinner portions 78 of the sleeve 12a tend to follow the contours of the swage ring. This is caused by pressure containment, as the ring 14 sequentially seals the various seals. This has a benefit in that the radially outwardly deformed sleeve portion 78 assists in holding the drive ring 14 on the fitting 10. This is in addition to the assistance provided by the anti-backoff grooves 58, 72.

Example

A test of the example fitting 10 was conducted using carbon steel 4130 type material with 1.5 inch and 2 inch fittings on A333/A106 pipe. Internal exposure testing of the assemblies was conducted using NACE TM0177 solution A for a duration of 30 days. Solution A is 5% NaCl acidified with 0.5% glacial acetic acid. Tests were conducted at 1 atm of $H_2S$ at room temperature (approximately 76-degrees F.) to assess Sulfide Stress Cracking (SSC). The solution and test specimens were initially deaerated with $N_2$ followed by continuous purging of $H_2S$ for the duration. The PH was initially 2.7 and was replenished when PH reached 3.8. No evidence of SCC or stress corrosion was observed in any samples. Accordingly, the fittings 10 were determined to be suitable for sour service applications within the $H_2S$ partial pressure temperature limitations listed in NACE MR0175, NACE MR0103-2007 and ISO 15156. Any temperature is allowed with a restrictive partial pressure of $H_2S$ of 15 psia. Advantageously, a commonly known material and grade of carbon steel has been found to be effective as a fitting in a sour environment, thereby avoiding the necessity to weld together joints.

In order to install the fitting 10 on a pipe 16, the pipe 16 is slid into the opening in the coupling body 12. Then the ring 14 is forced over the sleeve 12a until it substantially meets the flange 20.

The various parts of the fitting 10 may be machined out of bar stock, forgings, or tube stock.

The example fitting 10 for coupling with a pipe 16 in a sour environment includes a coupling body 12, a ring 14, a main seal 30, a transition section 24, 26, an inboard seal 32, and an outboard seal 34. The coupling body 12 has an inner surface defining a bore for receiving a pipe 16 therein at least one end thereof. The ring 14 is positioned to fit over the at least one end of the coupling body 12 for mechanically connecting said coupling body 12 to a pipe 16. The main seal 30 is formed on the inner surface of the coupling body 12. The transition section 24, 26 is formed as an indentation on the inner surface of the coupling body 12 adjacent the main seal 30. The transition section 24, 26 has a first portion with a first diameter and a second portion with a second diameter, with the first diameter being greater than the second diameter. The inboard seal 32 is formed on the inner surface of the coupling body 12 spaced inwardly from the main seal 30 and the at least one end of the coupling body 12. The outboard seal 34 is formed on the inner surface of the coupling body 12 spaced inwardly from the at least one end of the coupling body 12 and outwardly from the main seal 30. When the ring 14 is fitted over the at least one end of the coupling body 12 via force, the ring 14 and coupling body 16 apply a coupling force to the main seal 30, the outboard seal 32 and the inboard seal 34 to connect the pipe 16 to the coupling body 12 in a non-leaking manner.

The transition section may be positioned between the main seal and the inboard seal, and the first diameter may be positioned directly adjacent the main seal. The transition section may include an inboard transition section and an outboard transition section, with the inboard section being positioned adjacent the inner side of the main seal and the outboard section being positioned adjacent the outer side of the main seal. The main seal may include at least a first main seal and a second main seal, and the inboard and outboard transition sections adjacent said at least first and second main seals may have substantially the same inner diameter relative to the diametral position of each seal.

The fitting may include a torsion ridge formed on the inner surface of the coupling body, with the torsion ridge being positioned either inwardly or outwardly from the outboard seal. The fitting may include a circumferential flange positioned on an exterior surface of the body. The flange provides a stop against which the ring is forced. Each of the main seal, inboard seal, and outboard seal may be circumferentially continuous.

The main seal may include a first main seal, a second main seal, and a third main seal, with grooves being positioned between each of the first, second, and third main seals. The first main seal may be positioned on the inner surface of the coupling body at a first diameter, the second main seal may be positioned on the inner surface of the coupling body at a second diameter, and the third main seal may be positioned on the inner surface of the coupling body at a third diameter, with at least one of the first diameter, second diameter, and third diameter being different from one another. Each of said main seals may have a trapezoidal face.

The outboard seal may be a double seal. The ring is movable inwardly to sequentially seal the main seal, the outboard seal, and the inboard seal against a pipe as the ring is driven inwardly. Each of the outboard, inboard and main seals one or more of bites into or deforms a pipe as the ring is forced over the respective seal. The ring is a swage ring that includes a compression surface for sequentially sealing the outboard, main, and inboard seals against a pipe. The swage ring may have a first segment positioned adjacent the end of the ring and a second segment positioned inwardly from the end of the ring. The swage ring may further include a kickdown section.

The coupling body may have a first end and a second end, with the first and second ends being a mirror image of each other, and with a ring being positioned at each end. The coupling body may have a first end for receiving a pipe and a second end that serves as a flange.

In another example, a fitting for coupling with a pipe in a sour environment without welding includes a coupling body having an interior defining a bore for receiving a pipe therein, and a swage ring positioned to fit over an end of the coupling body for mechanically coupling the body to a pipe. The ring and coupling body are formed of a high strength, low alloy carbon steel that is resistant to corrosion in sour environments. The high strength, low alloy carbon steel may be UNS413000 or UNS414000 grades.

In another example, a fitting for coupling with a pipe in a sour environment includes a coupling body having an inner surface defining a bore for receiving a pipe therein at least one end thereof, a ring positioned to fit over the at least one end of the coupling body for mechanically connecting said coupling body to a pipe, and a main seal formed on the inner surface of the coupling body. The main seal includes a first seal, a second seal, and a third seal. The first seal is positioned inwardly at a first diameter relative to the inner surface of the coupling body, the second seal is positioned inwardly at a second diameter relative to the inner surface of the coupling body, and the third seal is positioned inwardly at a third diameter relative to the inner surface of the coupling body, with at least one of the first, second, and third diameters being different from one another. Each of said seals forming teeth for biting into or deforming the surface of a pipe.

The first seal may be positioned inwardly of the second and third seals. The first diameter may be greater than the second and third diameters. A transition section may be positioned adjacent the main seal. The transition section is an indentation of the inner surface of the coupling body and has a first transition portion with a first diameter and a second transition portion with a second diameter. The first transition portion has a first diameter that is positioned adjacent the first seal and has a greater diameter than the second diameter of the second transition portion.

The term "substantially," as used herein, is a term of estimation.

While various features of the claimed examples are presented above, it should be understood that the features may be used singly or in any combination thereof. Therefore, the claimed examples are not to be limited to only the specific examples depicted herein.

Further, it should be understood that variations and modifications may occur to those skilled in the art to which the claimed examples pertain. The examples described herein are exemplary. The disclosure may enable those skilled in the art to make and use alternative designs having alternative elements that likewise correspond to the elements recited in the claims. The intended scope may thus include other examples that do not differ or that insubstantially differ from the literal language of the claims. The scope of the disclosure is accordingly defined as set forth in the appended claims.

What is claimed is:

1. A fitting for coupling with a pipe in a sour environment comprising:
    a coupling body having an inner surface defining a bore for receiving the pipe therein at at least one end thereof;
    a ring positioned to fit over the at least one end of the coupling body for mechanically connecting said coupling body to the pipe;
    a main seal formed on the inner surface of the coupling body;
    a transition section formed as an indentation on the inner surface of the coupling body adjacent the main seal, said transition section having a first portion with a first diameter and a second portion with a second diameter, with the first diameter being greater than the second diameter;
    an inboard seal formed on the inner surface of the coupling body spaced inwardly from the main seal and the at least one end of the coupling body;
    an outboard seal formed on the inner surface of the coupling body spaced inwardly from the at least one end of the coupling body and outwardly from the main seal,
    wherein when said ring is fitted over the at least one end of the coupling body via force, the ring and coupling body apply a coupling force to the main seal, the outboard seal and the inboard seal sufficient to cause permanent deformation of the pipe to thereby connect the pipe to the coupling body in a non-leaking manner,
    wherein the main seal includes a first main seal, a second main seal, and a third main seal, with grooves being positioned between each of the first, second, and third main seals;
    wherein the first main seal is spaced inwardly from both of the second and third main seals; and
    wherein the first main seal is positioned on the inner surface of the coupling body at a first seal diameter, and both of the second and third main seals are positioned on the inner surface of the coupling body at a second seal diameter, with the first seal diameter being greater than the second seal diameter.

2. The fitting of claim 1, wherein the transition section is positioned between the main seal and the inboard seal, and the first diameter is positioned directly adjacent the main seal.

3. The fitting of claim 1, wherein the transition section comprises an inboard transition section and an outboard transition section, with the inboard section being positioned adjacent an inner side of the main seal and the outboard section being positioned adjacent an outer side of the main seal.

4. The fitting of claim 3, wherein the inboard and outboard transition sections adjacent said at least first and second main seals have substantially similar inner diameters relative to a diametral position of each seal.

5. The fitting of claim 1, further comprising a torsion ridge formed on the inner surface of the coupling body, with the torsion ridge being positioned either inwardly or outwardly from the outboard seal; and a circumferential flange positioned on an exterior surface of the body, said flange providing a stop against which the ring is forced; and wherein each of the main seal, inboard seal, and outboard seal are circumferentially continuous.

6. The fitting of claim 1, wherein each of said main seals has a cross-sectional geometry that provides a flat, trapezoidal face positioned to press down against the pipe.

7. The fitting of claim 1, wherein the outboard seal is a double seal comprising a pair of adjacent, independent seals each configured to press down against the pipe.

8. The fitting of claim 1, wherein the ring is movable inwardly to sequentially seal the main seal, the outboard seal, and the inboard seal against the pipe as the ring is driven inwardly.

9. The fitting of claim 8, wherein each of the outboard, inboard and main seals bites into or deforms the pipe as the ring is forced over the respective seal.

10. The fitting of claim 1, wherein said ring is a swage ring that includes a compression surface for sequentially sealing the outboard, main, and inboard seals against the pipe.

11. The fitting of claim 10, wherein the swage ring has a first segment positioned adjacent an end of the ring and a second segment positioned inwardly from the end of the ring.

12. The fitting of claim 10, wherein the swage ring further comprises a kickdown section.

13. The fitting of claim 1, wherein the coupling body has a first end and a second end, with the first and second ends being a mirror image of each other, and with a ring being positioned at each end.

14. The fitting of claim 1, wherein the coupling body has a first end for receiving the pipe and a second end that serves as a flange.

15. A fitting for coupling with a pipe in a sour environment without welding comprising:
   a coupling body having an interior defining a bore for receiving the pipe therein, and further comprising a main seal, an outboard seal located outwardly from the main seal, and an inboard seal located inwardly from the main seal,
   wherein the main seal includes a first main seal, a second main seal, and a third main seal, with grooves being positioned between each of the first, second, and third main seals, and wherein the first main seal is spaced inwardly from both of the second and third main seals and has a larger diameter than either of the second and third main seals; and
   a swage ring positioned to fit over an end of the coupling body for mechanically coupling the body to the pipe,
   wherein the swage ring and coupling body apply a coupling force to the main seal, the outboard seal and the inboard seal sufficient to cause permanent deformation of the coupling body and the pipe to thereby connect the pipe to the coupling body in a non-leaking manner, and
   wherein the ring and coupling body are formed of a high strength, low alloy carbon steel that is resistant to corrosion in sour environments.

16. The fitting of claim 15, wherein the high strength, low alloy carbon steel is UNS413000 or UNS414000 grades.

17. A fitting for coupling with a pipe in a sour environment comprising:
   a coupling body having an inner surface defining a bore for receiving the pipe therein at at least one end thereof;
   a ring positioned to fit over the at least one end of the coupling body for mechanically connecting said coupling body to the pipe;
   a main seal formed on the inner surface of the coupling body,
   an outboard seal located outwardly from the main seal, and
   an inboard seal located inwardly from the main seal,
   said main seal including a first seal, a second seal, and a third seal, wherein the first seal is positioned inwardly at a first diameter relative to the inner surface of the coupling body, the second seal is positioned inwardly at a second diameter relative to the inner surface of the coupling body, and the third seal is positioned inwardly at a third diameter relative to the inner surface of the coupling body, with at least one of the first, second, and third diameters being different from one another, with each of said seals forming teeth for biting into or deforming a surface of the pipe,
   wherein the first seal is positioned inwardly of both of the second and third seals, and
   wherein the first diameter is greater than either of the second and third diameters, and
   wherein the ring and coupling body apply a coupling force to the main seal, the outboard seal and the inboard seal sufficient to cause permanent deformation of the coupling body and the pipe to thereby connect the pipe to the coupling body in a non-leaking manner.

18. The fitting of claim 17, further comprising a transition section positioned adjacent the main seal, said transition section being an indentation of the inner surface of the coupling body and having a first transition portion with a first diameter and a second transition portion with a second diameter, wherein the first transition portion having a first diameter is positioned adjacent the first seal and has a greater diameter than the second diameter of the second transition portion.

* * * * *